June 12, 1956 H. K. FOSTER 2,749,743
APPARATUS FOR TESTING HOLLOW OBJECTS
Filed July 29, 1952 2 Sheets-Sheet 1
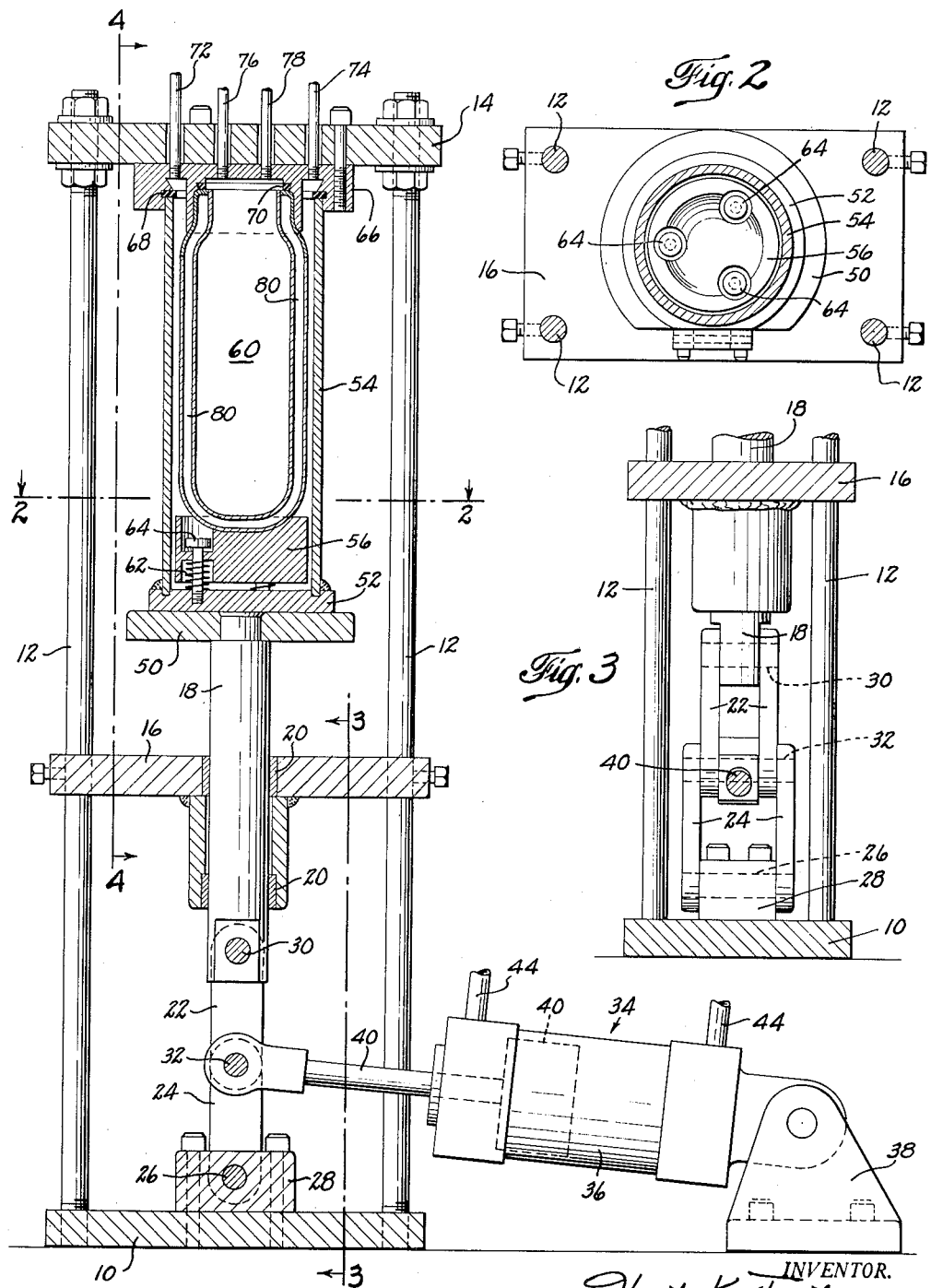
INVENTOR.
Hoyt K. Foster
BY
Morgan, Finnegan & Durham
ATTORNEYS.

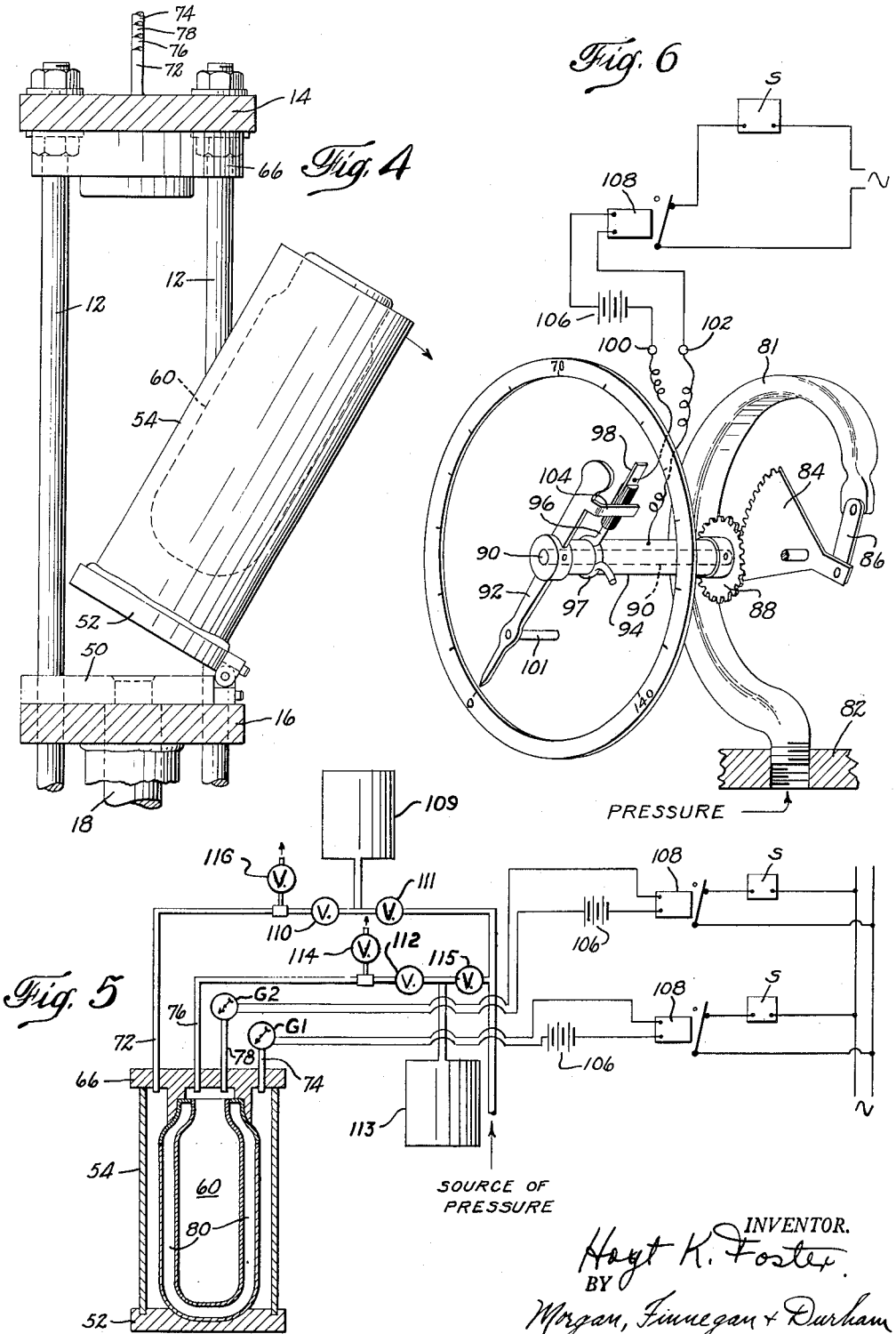

United States Patent Office 2,749,743
Patented June 12, 1956

2,749,743

APPARATUS FOR TESTING HOLLOW OBJECTS

Hoyt K. Foster, Hollis, N. Y., assignor to S. W. Farber, Inc., New York, N. Y., a corporation of New York Application July 29, 1952, Serial No. 301,551

3 Claims. (Cl. 73—49.3)

The present invention relates to a novel and improved apparatus for the testing of hollow objects such as small Dewar flasks, which may be formed of metal, to ascertain whether leaks are present either in the interior of the container or in the vacuum portion of the container.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The present invention has for its object the provision of a novel and improved apparatus for the pressure testing of Dewar flasks and other containers having an air tight portion to ascertain the presence of any leakage. Still another object is the provision of an improved testing apparatus by which the several parts of a multi-walled container may be charged with pressure and any reduction in the pressure within any portion of the vessel causes a signal to be actuated thereby indicating leakage. More specifically the invention provides a testing apparatus by which a container having a surrounding evacuated shell or other separate sealed chamber may be rapidly tested with certainty to ascertain whether there is any leakage from the evacuated portion of the container either to the interior or the exterior of the container.

According to the present invention an accumulator, in valved communication with one side (as for example the exterior) of the double walled flask, or similar object, is charged from a suitable source with compressed air at a predetermined pressure. Communication with the source of compressed air is then shut off and communication between the accumulator and said one side of the flask established by opening said valve with a pressure gauge indicating the magnitude of the pressure applied to said one side. The pressure gauge is provided with signal actuating means associated with the indicating mechanism thereof in such a manner that any reduction in pressure from the maximum to which the gauge is subjected causes actuation of the signal, so that the operator is warned that a particular wall of the container is defective. Upon completion of this test the pressure is relieved and incident thereto the signal actuating means is automatically reset so that it is readied for another testing operation. This process is then repeated with respect to the other side of the container and after both sides have been tested in this manner the container is removed and another installed and readied for testing. The apparatus also preferably provides means for automatically making all of the needed connections to the container as the container is positioned within the apparatus, so that the operations are greatly simplified and the possibility of error is reduced.

The accompanying drawings, referred to herein and constituting a part hereof, illustrate one embodiment of the invention, and together with the description, serve to explain the principles of the invention.

Of the drawings:

Figure 1 is a vertical section through a preferred and illustrative form of the present invention;

Figure 2 is a cross section taken on the line 2—2 of Figure 1;

Figure 3 is a fragmentary vertical section taken on line 3—3 of Figure 1;

Figure 4 is a fragmentary vertical section taken on the line 4—4 of Figure 1;

Figure 5 is a schematic diagram showing the fluid pressure and electrical connections for the testing of the flask by the apparatus of the present invention; and Figure 6 is an expanded schematic view showing a pressure responsive gauge as used in the preferred form of the present invention.

It will be understood that the foregoing general description and the following detailed description as well are exemplary and explanatory of the invention but are not restrictive thereof.

Referring now in detail to the present preferred and illustrative embodiment of the invention as shown in the accompanying drawings, the apparatus is shown generally in Figure 1 of the drawings and comprises a base member 10 provided with upright supports 12 to the upper end of which are fastened a plate 14, while a guide member 16 is fixed to the supports at an intermediate point. A heavy sliding rod 18 is vertically movable in bearings 20 mounted in the guide member 16, and is moved up and down between fixed limits by means of the toggle links 22 and 24. The lower links 24 of the toggle are pivoted by pin 26 in a block 28 which is fast to the base plate 10, while the upper ends of the links 22 are pivoted to the lower end of the rod 18 by means of pin 30, and the links are held together by means of pin 32.

A fluid pressure motor 34 is provided for actuating the toggle and comprises a pivoted cylinder 36 pivotally mounted in an anchor member 38, and a piston and rod 40 directly connected to the pin 32, the cylinder being supplied with actuating fluid pressure at one end or alternatively at the other end by means of the supply pipes 44. By selective application of pressure the toggle is made or broken to push the rod 18 up or down as desired.

At the upper end, rod 18 is provided with a receiving member adapted to receive, locate and hold the container to be tested. As embodied, a plate 50 is secured to the upper end of rod 18, a separate plate 52 is hingedly mounted on plate 50, and plate 52 has welded to it a cylindrical container 54 which is slightly larger in diameter and slightly longer than the container to be tested. The cylinder 54 is preferably welded to the plate 52 so as to provide a gas tight seal between them.

At the bottom of cylinder 54 there is provided a resiliently mounted seat 56 which is provided with a concavity on its upper face to conform to and receive the bottom of the flask 60 to be tested. Seat 56 is resiliently urged upwardly away from the plate 52 by means of a plurality of springs 62 bearing against the plate 52 and received within suitable holes in the seat 56, while the seat is held against extreme upward movement by means of the headed screws 64 which are received in other aligned holes in the seat and are threaded into the plate 52. Thus, a firm, even upward pressure is exerted on the container 60 received within the cylinder 54, while the concavity in the seat 56 serves to locate the container 60 within the cylinder 54.

Cooperating with the upper end of the cylinder 54 and the upper or open end of the container 60 is a recessed plate 66 which is mounted on the under side of the top plate 14 and secured thereto. Plate 66 is provided with an annular shouldered cavity adapted to fit snugly about the upper end of the cylinder 54, and is also provided at one of its shoulders with a resilient gasket 68 which is adapted to contact with and seal the upper end of the cylinder to the cavity. Another circular cavity of smaller diameter and concentric with the first is provided in the plate 66 and is also shouldered and provided with a resilient gasket 70 to engage and seal the upper mouthed end of the container 60.

Means are also provided for applying separate fluid pressures to the exterior and the interior of the container, for indicating the magnitude of the pressures thus applied and for relieving these pressures at the completion of the testing operation. As embodied, pipes 72 and 74 are connected through plate 66 to the outer annular cavity just inwardly of the gasket 68 with the former supplying and exhausting pressure from the space between the cylinder 54 and the exterior of the container 60 and the latter establishing communication with a suitable pressure gauge. Similarly, a supply and exhaust pipe 76 is connected through plate 66 to the inner cavity to supply pressure to and exhaust pressure from the interior of the container 60 and pipe 78 is connected to said inner cavity for establishing communication between said interior and a suitable pressure gauge. In case there is even a very minute leak in the container 60, the pressure in the outer portion will be reduced as the compressed air leaks into the outer space 80 of the container 60, or alternatively as the compressed air leaks from the interior of the container 60 into the space 80 which should be evacuated and sealed.

When the testing operation has been completed, the fluid supply to the motor 36, 40 is changed so as to cause the toggle to be broken thereby lowering the plunger 18 and its supported cylinder 54 and container 60. Cylinder 54 may then be swung about its hinge, as shown in Figure 4, thereby providing access so that the container 60 may be removed and replaced by another to be tested.

Figure 6 shows an illustrative and preferred form of the pressure responsive gauge used in the apparatus of the present invention. In this, means are provided responsive to the applied pressure including a movable contact and a second contact which is advanced as the pressure is increased and makes contact with the first only when the pressure is increasing or is being maintained at a substantially constant value, while other means are provided for retracting the second contact on a substantial reduction in pressure so that the second contact is readied for a future operation.

As embodied, the pressure responsive means comprises a modified form of Bourdon gauge having a Bourdon tube 81 to which the pressure from one or the other of the charged spaces may be applied, one end of the tube 81 being anchored in a base member 82, while the free end of the tube is connected to a segmental gear 84 by means of a link 86, gear 84 being meshed with a pinion 88 on the pointer shaft 90.

As the pressure changes, shaft 90 rotates carrying with it the pointer 92, shaft 90 being rotatably journalled in a fixed sleeve 94. On the fixed sleeve 94 is mounted a light arm 96 formed of spring material and bent to provide a looped portion 97 which lightly grips sleeve 94 and is seated in a shallow groove in the sleeve 94, being frictionally held in position by means of the slight spring pressure exerted against the sleeve. Near its outer end, arm 96 is provided with a contact 98 insulated from the arm but connected by means of a light flexible wire with an external terminal 100, and adapted to be contacted by a first contact 101 extending inwardly from the pointer member 92, the pointer being connected through a flexible wire to another external terminal 102.

Pointer 92 is also provided with a return member 104 which comprises a light arm which extends first in the plane of rotation of the pointer and then rearwardly sufficiently to engage the arm 96 so that reverse rotation of the pointer, as on a reduction of pressure, causes the arm 96 to be moved in a reverse direction so that it is set for the next operation. The spring force exerted by the arm 96 on its supporting sleeve 94 is just sufficient to hold the arm 96 in the position to which it is moved either as it is pushed ahead by engagement of the contact 98 by contact 101, or is moved in the reverse direction by engagement with the return member 104.

As a matter of convenience, the pressure responsive means is preferably adapted to cause actuation of a signal when a reduction in pressure occurs, and for this purpose the terminals 100 and 102 are connected between a source of power 106 and a relay 108, and signal S is energized only when relay 108 is de-energized.

Figure 5 shows schematically a preferred arrangement for interconnecting the valves, pipes, accumulators, pressure responsive members and signals of my inventive organization. In conducting a complete test upon a container, compressed air, under predetermined pressure, is supplied through valve 111 to accumulator 109 with valve 110 closed. Valve 111 is then closed and, with valve 116 maintained closed, valve 110 is opened bleeding the compressed air from accumulator 109 through pipe 72 to the space surrounding container 60. The pressure in said space stabilizes almost immediately with gauge G1, in communication with said space through pipe 74, indicating the magnitude of said pressure. Should a leak occur through the outside wall of the container into the evacuated space 80, gauge G1 will indicate a reduction in pressure which causes actuation of relay 108 and signal S associated therewith. By charging accumulator 109 to a predetermined pressure, for a container of a particular size, it is known exactly what gauge G1 should read when valve 110 is opened which makes it possible to determine whether the leak is merely through the outer wall or through both the outer and the inner wall since if merely through the outer wall gauge G1 will indicate a predetermined reduction sufficient to accommodate evacuated space 80 while if the leak is through both of the walls a much greater reduction will be experienced. This charging arrangement also facilitates the determination of a leak should signal S for some reason fail to energize.

The test may be made either with valve 110 open or closed, although the sensitivity of gauge G1 to leakage in the space surrounding container 60 will be considerably greater if the volume of accumulator 109 is excluded by closing valve 110. After the test is complete, it requiring only a few minutes to determine the presence of even a very minute amount of leakage, valve 116 is opened releasing the pressure to atmosphere. Thereafter the interior of said container is tested in like manner first charging accumulator 113 through valve 115 with valve 112 closed. Valve 115 is then closed and with valve 114 maintained closed valve 112 is opened bleeding the compressed air from accumulator 113 through pipe 76 to the interior of container 60. The presence or absence of leakage from the interior of the container is determined through gauge G2 and its associated signal after which the pressure is relieved through valve 114 whereupon the container may be removed from the testing apparatus as previously described.

As the pressure is reduced at the end of each testing operation the pointers 92 return to zero, and cause the second contacts 98 of each of the pressure gauges to be moved reversely so as to be ready for the next testing operation.

The invention in its broader aspects is not limited to the specific mechanisms shown and described but departures may be made therefrom within the scope of the accompanying claims without departing from the principles of the invention and without sacrificing its chief advantages.

What is claimed is:

1. In an apparatus for testing a container for leakage, the combination of means for supplying air at a pre-determined pressure to the container, electrical signal means for indicating the presence of a leak in the container, pressure-responsive means for measuring the value of the pressure in the container, and a contact on the pressure-responsive means arranged to actuate the signal means upon a decrease in air pressure below the predetermined value said contact being engaged by the pressure-responsive means prior to reaching the predetermined value and disengaged upon a decrease in pressure to actuate the signal means.

2. Apparatus as claimed in claim 1 in which a Bourdon gage comprises the pressure-responsive means for measuring the pressure in the container and the indicating needle thereof engages the contact.

3. Apparatus as claimed in claim 2 in which the needle of the Bourdon gage is provided with means for advancing the contact downwardly from the maximum pressure point upon a decrease in pressure in the container.

References Cited in the file of this patent

UNITED STATES PATENTS

| | | |
|---|---|---|
| 631,809 | Nicla et al. | Aug. 29, 1899 |
| 886,833 | Melvin | May 5, 1908 |
| 1,649,287 | Butler | Nov. 15, 1927 |
| 1,904,226 | Henneberger | Apr. 18, 1933 |
| 2,019,517 | Widell | Nov. 5, 1935 |
| 2,232,711 | Maher | Feb. 25, 1941 |
| 2,403,938 | Macan | July 16, 1946 |
| 2,551,020 | Laxo | May 1, 1951 |
| 2,565,086 | Peterson | Aug. 21, 1951 |
| 2,573,053 | Pearlman | Oct. 30, 1951 |
| 2,647,396 | Aller | Aug. 4, 1953 |